UNITED STATES PATENT OFFICE.

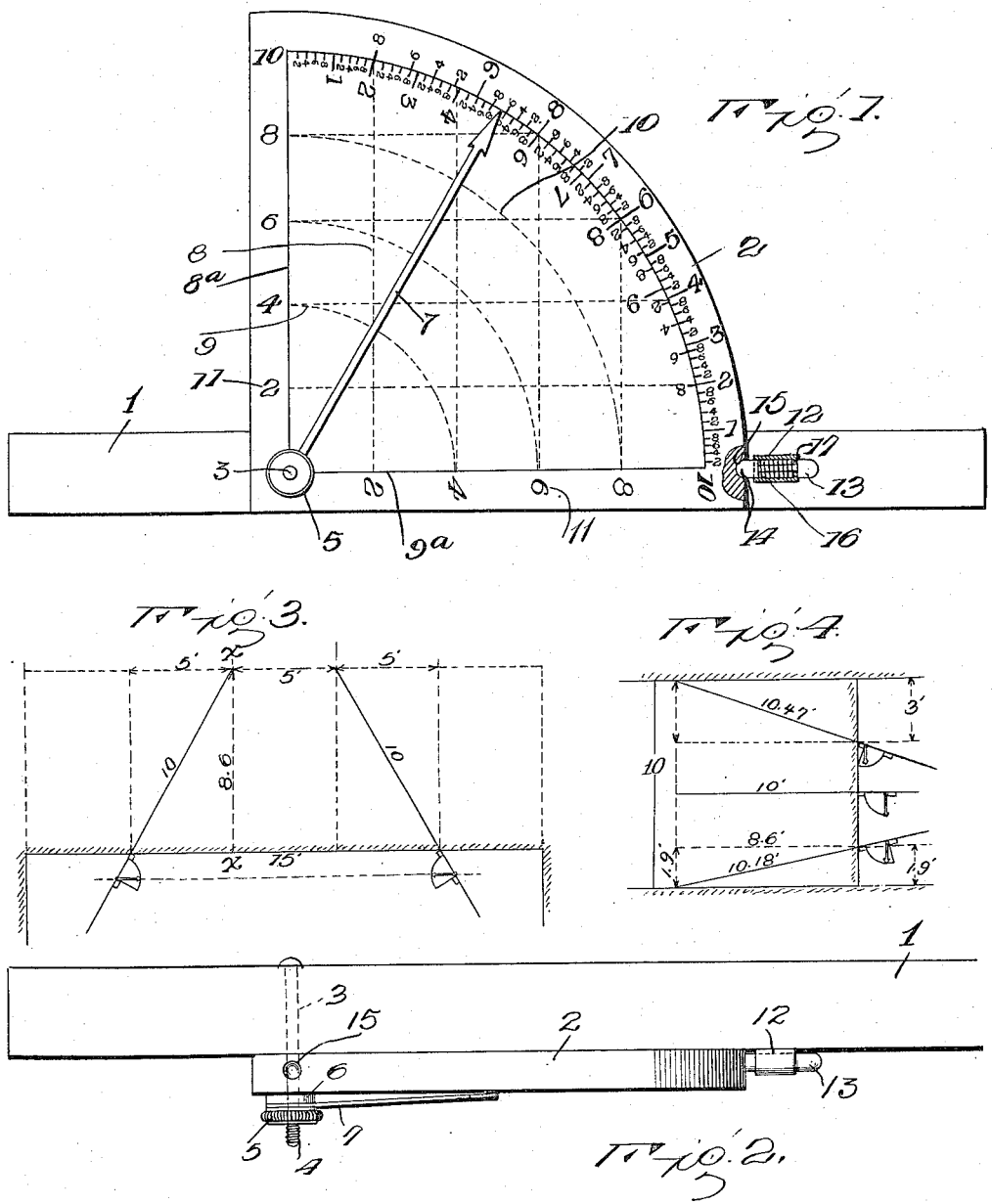

ARCHIBALD HARRIGAN, OF GRAND RAPIDS, MICHIGAN.

DRILLING AND BLASTING GAGE.

1,155,355.      Specification of Letters Patent.      Patented Oct. 5, 1915.

Application filed September 23, 1913. Serial No. 791,394.

*To all whom it may concern:*

Be it known that I, ARCHIBALD HARRIGAN, citizen of the United States, residing at Grand Rapids, in the county of Kent and State of Michigan, have invented certain new and useful Improvements in Drilling and Blasting Gages, of which the following is a specification.

This invention has as its object to provide a gage which may be employed by miners in drilling and blasting, for the purpose of determining the direction in which the hole to receive the blast charge should be drilled.

In the accompanying drawings, Figure 1 is a view in side elevation of the gage embodying the present invention. Fig. 2 is a top plan view thereof. Figs. 3 and 4 are diagrammatic views illustrating the manner in which the holes are to be drilled, Fig. 3 being in the nature of a horizontal section at the head of a tunnel and Fig. 4 in the nature of a vertical section of the same.

Corresponding and like parts are referred to in the following description and indicated in all the views of the accompanying drawings by the same reference characters.

In the drawings, the stock of the gage is indicated by the numeral 1 and is preferably in the nature of a bar which is rectangular in cross section. The stock 1 supports a quadrant which is indicated by the numeral 2 and which is mounted upon one side of the stock by means of a pivot bolt 3 fitted through the stock and through the quadrant 2 at the apex thereof. The pivot 3 is threaded at one end, as indicated at 4, and it has fitted upon its said end a thumb nut 5. A washer 6 is also fitted upon the bolt 3 and rests against the face of the quadrant and an indicator hand 7 is pivotally mounted upon the bolt 3. It will be understood at this point, that the indicator hand 7 may be moved over the face of the quadrant while the latter is held stationary by means which will be presently explained, and the face of the quadrant is provided with a scale of graduations along an arc inscribed adjacent its arcuate edge concentric therewith, the pivot 3 being located at the center of the arc and radial lines 8ª and 9ª extending from the pivot to each end of the arc. In the drawing, I have shown a series of inner concentric arcs 10 and a series of straight lines 8 and 9 parallel with the respective radial lines, but these parallel and concentric lines are not essential although they aid in approximate readings, a column of numerals 11 being marked along each radial line. The scale of graduations is in duplicate, that is to say, a scale is marked at the outer side of the outermost arc and a similar scale is marked at the inner side of said arc, one scale being read from one radial line and the other scale being read from the other radial line. The graduations are determined by trigonometrical calculations and are measured at right angles to the radial edge of the quadrant, the scale on one side of the arc denoting the base of a right triangle and the scale on the other side denoting the perpendicular, the hypotenuse being the same in every case. In practice, the graduations are usually determined for intervals of .2 of a foot for each foot of the hypotenuse which is taken to represent 10 feet. The lines 8, 9 and 10 permit a very rapid approximate reading of the indicator so that the pointer and the quadrant may be very quickly brought approximately to the desired relative positions, and the arcuate scale then permits a close and accurate reading.

The gage is adapted for use when drilling right hand or left hand, and in order that the quadrant may be readily shifted from one position to another and held at adjustment, a small latch is provided on the stock 1 and includes a casing 12 within which is slidably mounted a latch pin 13 having an engaging end 14 adapted to seat in the keeper notches 15 formed in the arcuate edge of the quadrant adjacent the ends of the said edge. A spring 16 is fitted upon the latch pin 13 and bears at one end against the engaging end 14 and at its other end against a collar or shoulder 17 within the casing 12.

In order that the manner of using the gage may be readily understood reference is to be had to Figs. 3 and 4 in the first of which figures there is shown diagrammatically in plan view the arrangement of the holes to be drilled and in Fig. 4 a side view of a similar nature is shown. In Fig. 3 the hatched horizontal line indicates the head or end wall of the tunnel and the vertical hatched lines indicate the side walls of the tunnel, while the inclined full lines indicate the intended location of holes to be drilled. In Fig. 4 the vertical hatched line indicates the end wall or head of the tunnel while the upper and lower hatched lines indicate the roof and floor respectively with the desired continuation of the same, while the inclined full lines and the central horizontal line indicate the desired locations of holes to be drilled. The dimensions are given in these two figures in the customary manner and it will be observed that the tunnel is ten feet high as indicated in Fig. 4 and that the entrance points of the holes at the opposite sides of the middle of the heading of the tunnel are located horizontally fifteen feet apart, as indicated in Fig. 3. By reference to Fig. 3 it will be observed that the inner or terminal ends of the two sets of holes are to be five feet apart horizontally and spaced an equal distance from the central vertical longitudinal plane of the heading. It will also be observed by reference to Fig. 4, that the inner ends of the holes are to all occupy the same vertical plane and it may be stated at this point that by the use of the gage embodying the invention this symmetrical arrangement and relative location of the holes may be secured whereas without the use of such a gage the relative arrangement and points of termination of the holes are indeterminate and the results are extremely unsatisfactory. With the dimensions given it will be assumed that it is desired to drill three holes at each side of the central vertical plane of the heading, the upper one of which holes will slant upwardly and inwardly, the lower one inwardly and downwardly and the intermediate one substantially horizontally and inwardly and it will also be assumed that it is desired that the holes approach the line $x$—$x$ in Fig. 3, from their open or entrance ends five-tenths or one-half a foot for every foot of hole drilled. The user of the gage may with this data at hand readily determine the advance per foot of hole drilled by holding the gage horizontally against the face of the heading at the point of entrance of the hole and then moving the pointer of the gage to the scale mark 5 upon the arcuate scale as shown, for example, in Fig. 1 of the drawings and as indicated diagrammatically in Fig. 3.

Referring now more specifically to Fig. 1 it will be observed that the end of the pointer is on the mark reading 8.6 which indicates eighty-six hundredths of a foot advance per foot of hole drilled. Further referring to Fig. 3 of the drawings it will be observed that when the pointer is set at number 5 on the gage and the gage is held horizontally but with its stock at such an angle to the face of the heading that the pointer will be parallel to the said face, the position assumed or line followed by the stock will indicate exactly the angle to the face of the heading horizontally at which the drill is to be held or positioned in order to secure the desired initial inclination of the hole. The drill may then be brought to and secured in the position thus determined after which the gage is removed and manipulated to determine the upward or downward inclination to be given the drill. In order to determine the angle at which the drill must be held to secure the desired upward or downward inclination of the holes, the distance between the roof of the tunnel and the entrance end of the upper hole is measured and as indicated, for example, in Fig. 4, is three feet. The gage is then disposed vertically with its stock uppermost and the stock is then inclined until the pointer registers with number 3 on the gage, which will give the desired inclination. The drill is shifted (without changing its horizontal angle to the face of the heading) until it assumes the same inclination as the stock of the gage, it being understood that the position of the drill is determined by bringing it against the stock of the gage while its end bears against the point at which the hole is to be started. For determining the angle of inclination of the lower hole measurement is taken from the floor to the entrance of the hole and the gage is then manipulated as just described.

It is obvious that the spaces defined by the scales are not all equal and all the marks forming the two scales consequently do not register inasmuch as the calculations for the scale are based on the theorem that the square of the hypotenuse is equal to the sum of the squares of the two sides. As shown in the drawing, however, the mark numbered 8 on one scale registers with the mark numbered 6 on the other scale. The function of the gage will be readily appreciated by illustrative reference to the numbers 8 and 6. If the device be held against the rock face of a tunnel, for instance, so that the pointer is parallel with the face of the tunnel and its end rests upon the numerals 8 and 6, such reading will indicate that, if a hole 10 feet long be drilled in a line forming a continuation of the line then occupied by the stock of the gage, the inner end of such hole will be at a point 8 feet distant from the face of the tunnel and removed laterally 6 feet from a line perpendicular to the face of the tunnel and extending from the outer open end of the hole which is located in said face. The quadrant is, of course, adjusted pivotally upon the stock so that it may lie at either side of the stock and the measurement for the progression inwardly from the face of the rock will be read upon the scale having its zero at the face of the rock, while the other scale will give the measurement for the lateral deviation or the deviation from a line perpendicular to the face of the rock.

Having thus described the invention what is claimed as new is:

1. In a gage of the class described, a stock, a quadrant having its apex disposed against the stock, an indicator hand disposed against one face of the quadrant, a pivot fitted through the hand, the quadrant and the stock and supporting the quadrant for pivotal movement upon the stock and the hand for angular movement across the face of the quadrant, the quadrant being provided upon its face with a scale concentric with the pivot and being movable about the pivot across the stock to bring either radial edge into parallelism with the stock, and means on the stock for holding the quadrant at adjustment upon the stock.

2. In a gage of the class described, a stock, a quadrant disposed against the stock and pivoted at its apex thereto, whereby it may be moved to lie with either radial edge parallel with the stock, the arcuate edge of the quadrant being provided at its ends with keeper sockets, a latch pin upon the stock adapted to engage either socket whereby to hold the quadrant at adjustment, and an indicator hand pivotally mounted for angular adjustment across the face of the quadrant, the quadrant being provided upon said face with a scale defining the path of movement of the free end of the indicator hand.

In testimony whereof I affix my signature in presence of two witnesses.

ARCHIBALD HARRIGAN. [L. S.]

Witnesses:
H. VAN AALDEREN,
J. VANDENBURG.

Copies of this patent may be obtained for five cents each, by addressing the "Commissioner of Patents, Washington, D. C."